(12) United States Patent
Watanabe et al.

(10) Patent No.: US 7,708,540 B2
(45) Date of Patent: May 4, 2010

(54) INJECTION MOLDING MACHINE

(75) Inventors: Hiroshi Watanabe, Yamanashi (JP);
Nobuto Takeda, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 0 days.

(21) Appl. No.: 12/123,695

(22) Filed: May 20, 2008

(65) Prior Publication Data
US 2008/0299242 A1 Dec. 4, 2008

(30) Foreign Application Priority Data
May 28, 2007 (JP) ............... 2007-140478

(51) Int. Cl.
*B29C 45/80* (2006.01)
(52) U.S. Cl. ............... 425/139; 264/334; 425/444
(58) Field of Classification Search ........... 425/139, 425/444, 135; 700/200; 264/40.5, 334
See application file for complete search history.

(56) References Cited

U.S. PATENT DOCUMENTS

| | | | |
|---|---|---|---|
| 5,492,658 A * | 2/1996 | Ohno et al. | 264/40.1 |
| 5,599,486 A * | 2/1997 | Fujishiro et al. | 264/40.1 |
| 5,639,486 A * | 6/1997 | Yamaguchi | 425/139 |
| 6,527,534 B1 * | 3/2003 | Kamiguchi et al. | 425/139 |
| 6,533,972 B1 * | 3/2003 | Stirn | 264/40.5 |
| 6,669,877 B2 * | 12/2003 | Matsubayashi et al. | 264/40.1 |
| 7,252,796 B2 * | 8/2007 | Nishizawa | 264/40.1 |

FOREIGN PATENT DOCUMENTS

| | | |
|---|---|---|
| JP | 01071722 A | 3/1989 |
| JP | 05286001 A | 11/1993 |
| JP | 09254222 A | 9/1997 |
| JP | 2005066856 A | 3/2005 |

OTHER PUBLICATIONS

Douglas M. Bryce, Plastics Injection Moulding . . . manufacturing process fundamentals, Plastic Injection Molding Manufacturing Process Fundamentals, Jan. 1, 1996, pp. 72-79.
EP Search Report for 08104091.7 dated Sep. 18, 2008.

* cited by examiner

*Primary Examiner*—Yogendra N Gupta
*Assistant Examiner*—Emmanuel S Luk
(74) *Attorney, Agent, or Firm*—Lowe Hauptman Ham & Berner LLP

(57) ABSTRACT

An injection molding machine that performs a safe ejecting action of a molded article until a setting state of an ejector rod and a set forward end position for an ejection stroke of a molded article ejector are suitable for a mold in use. A resistor R1 is set to ON when a mold is changed and a resistor R2 is set to ON when a set value of the forward end position of the ejection stroke is changed. When resistor R1 or resistor R2 is ON, ejection is performed with a reduced ejecting force and at a reduced ejecting velocity. When a detected position of the ejector rod reaches the set forward end position, resistors R1 and R2 are turned OFF and thereafter the ejection is performed with a normal ejecting force and a normal ejecting velocity, to thereby prevent damage to the mold or to the molded article ejector.

2 Claims, 3 Drawing Sheets

INJECTION MOLDING MACHINE

RELATED APPLICATIONS

The present application is based on, and claims priority from, Japanese Application Number 2007-140478, filed May 28, 2007, the disclosure of which is hereby incorporated by reference herein in its entirety.

BACKGROUND OF THE INVENTION

1. Field of the Invention

The present invention relates to an injection molding machine, and more particularly to an injection molding machine having a molded article ejector in which an advancing stroke of an ejector rod can be set.

2. Description of Related Art

An injection molding machine is equipped with a molded article ejector that, after opening the mold, thrusts an ejector pin into the interior of the mold to eject the molded article adhering to the interior of the mold so as to remove the molded article from the mold. The molded article ejector advances ejector rods to push and advance an ejector plate provided inside the mold, so as to thrust an ejector pin provided on the ejector plate into the interior of the mold and eject the molded article from the interior of the mold.

The number of ejector rods that push the ejector plate that are mounted differs depending on the configuration of the mold, and therefore when changing molds it is necessary to make sure that the number of ejector rods matches the mold structure. If the configuration of the mold and the number of ejector rods do no match, the ejector rods will push the mold when the ejector rods advance after the mold is mounted and the molded article ejector could damage the mold.

In addition, there is a maximum advancing stroke of the ejector pin for each mold, and therefore the advancing stroke of the molded article ejector rods can be set for each mold. In a molded article ejector of this type, if there is an error in the value set for the advancing stroke of the molded article ejector rods and as a result the stroke is set beyond a permissible range, then when the molded article ejector rods are advanced they exceed a permissible stroke and attempt to move the ejector plate, and the ejector plate pushes the mold. As a result, the molded article ejector or the mold could be damaged.

Particularly in the case of an injection molding machine having a device that clamps the mold on a surface of a movable platen magnetically, since the mold is not clamped mechanically, the mold could fall when pushed by the ejector rods.

Conventionally, to confirm the ejection stroke, for example, a method is known that detects a state in which the molded article ejector can no longer advance, and that position is set as an advance limit position (see JP05-286001A). In addition, an invention is also known in which, during an initial advance, the molded article ejector is driven according to an advance operation pattern of set movement velocity and movement amount and the molded article ejected, with the advance operation pattern for the next and all subsequent advances determined on the basis of the final movement position obtained in this initial advance (e.g., JP09-254222A).

Moreover, an invention is also known that, in an injection molding machine that has a mold clamping device that mounts and clamps the mold on the fixed platen and the movable platen magnetically, by limiting a force with which the mold is opened (the mold is released) and the molded article ejected to a value that does not exceed a clamping force with which the mold is clamped to the movable platen, prevents the mold from separating from and falling off the movable platen due to the molded article ejecting force (JP2005-66856A).

As described above, mounting a number of ejector rods that does not match the configuration of the mold or using the wrong setting value for the amount of movement of the advancing stroke by the molded article ejector could damage the mold or the molded article ejector, or, if using a mold clamping device that mounts and clamps the mold magnetically, there is a risk that a force greater than the magnetic clamping force could be exerted on the mold by the molded article ejector and the mold could separate from and fall off the movable platen. As a result, when driving the molded article ejector, detecting the movement limit position of the advancing stroke, and determining a forward end position of the movement stroke of the molded article ejector rods (ejector pin) on the basis of that movement limit position as with the inventions described in JP05-286001A and JP09-254222A, since the movement limit position is set as the forward end position, this determined forward end position is not always optimal because, even in cases in which it is necessary to set a position further back as the forward end position and carry out molding, the movement limit position is set as the forward end position and molding is carried out. In addition, when the molded article ejector is driven when the mold is changed and one forgets to execute the operation of detecting the advancing stroke movement limit position, there is a risk that the mold or the molded article ejector may be damaged or that the mold may fall. Moreover, when using a mold clamping device that clamps the mold magnetically, with a method that sets the ejecting force to something less than the clamping force that clamps the mold to the moving platen, it is necessary to calculate the clamping force in advance. Consequently, if the calculation is erroneous, there is the same risk that the mold might fall. Furthermore, there is the problem that, if for some reason the magnetic clamping force changes, the set force must be revised.

SUMMARY OF THE INVENTION

The present invention provides an injection molding machine capable of maintaining a safe ejection state until it is confirmed that an ejecting action of an ejector rod is carried out up to a set forward end position when a mold is changed or when a set value of the forward end position of an ejection stroke of a molded article ejector has been changed.

An injection molding machine of the present invention comprises: an ejector for ejecting a molded article from a mold by actuating an ejector rod to produce a set ejecting force and advance to a set forward end position of an ejection stroke; first determining means that determines whether or not the mold has been changed; second determining means that determines whether or not setting of the forward end position of the ejection stroke has been changed; position detection means that detects a position of a distal end of the ejector rod of said ejector during actuation of the ejector rod; first setting means that sets the ejecting force to a protective ejecting force lower than a normal ejecting force when said first determining means determines that the mold has been changed or said second determining means determines that the setting of the forward end position of the ejection stroke has been changed; and second setting means that sets the ejecting force to the normal ejecting force when said position detecting means detects that the distal end of the ejector rod has reached the set forward end position of the ejection stroke during actuation of the ejector rod to produce the set protective ejecting force.

With the above arrangement, the ejector rod is actuated to produce a protective ejecting force that is smaller than a normal ejecting force until an appropriate value is set for the forward end position of the ejection stroke to thus enhance safety.

The ejector rod of the ejector may be actuated to advance at a set ejecting velocity. In this case, the first setting means may set the ejecting velocity to a protective ejecting velocity lower than a normal ejecting velocity when it is determined that the mold has been changed or that the setting of the forward end position of the ejection stroke has been changed, and said second setting means may set the ejecting velocity to the normal ejecting velocity when it is detected that the distal end of the ejector rod has reached the set forward end position of the ejection stroke during actuation of the ejector rod to advance at the set protective ejecting velocity and to produce the set protective ejecting force.

When the mold is changed or when the setting of the forward end position of the ejection stroke is changed, the ejection is performed with the protective ejecting force smaller than the normal ejecting force until it is detected that the distal end of the ejector rod has reached the set forward end position of the ejection stroke. Until a value of the forward end position of the ejection stroke that is suitable for the mold in use is set, the ejecting force is not set to the normal ejecting force, so that the mold or the ejector is prevented from being damaged and a mold magnetically mounted on a movable platen is prevented from falling off.

DETAILED DESCRIPTION

Figure 1:
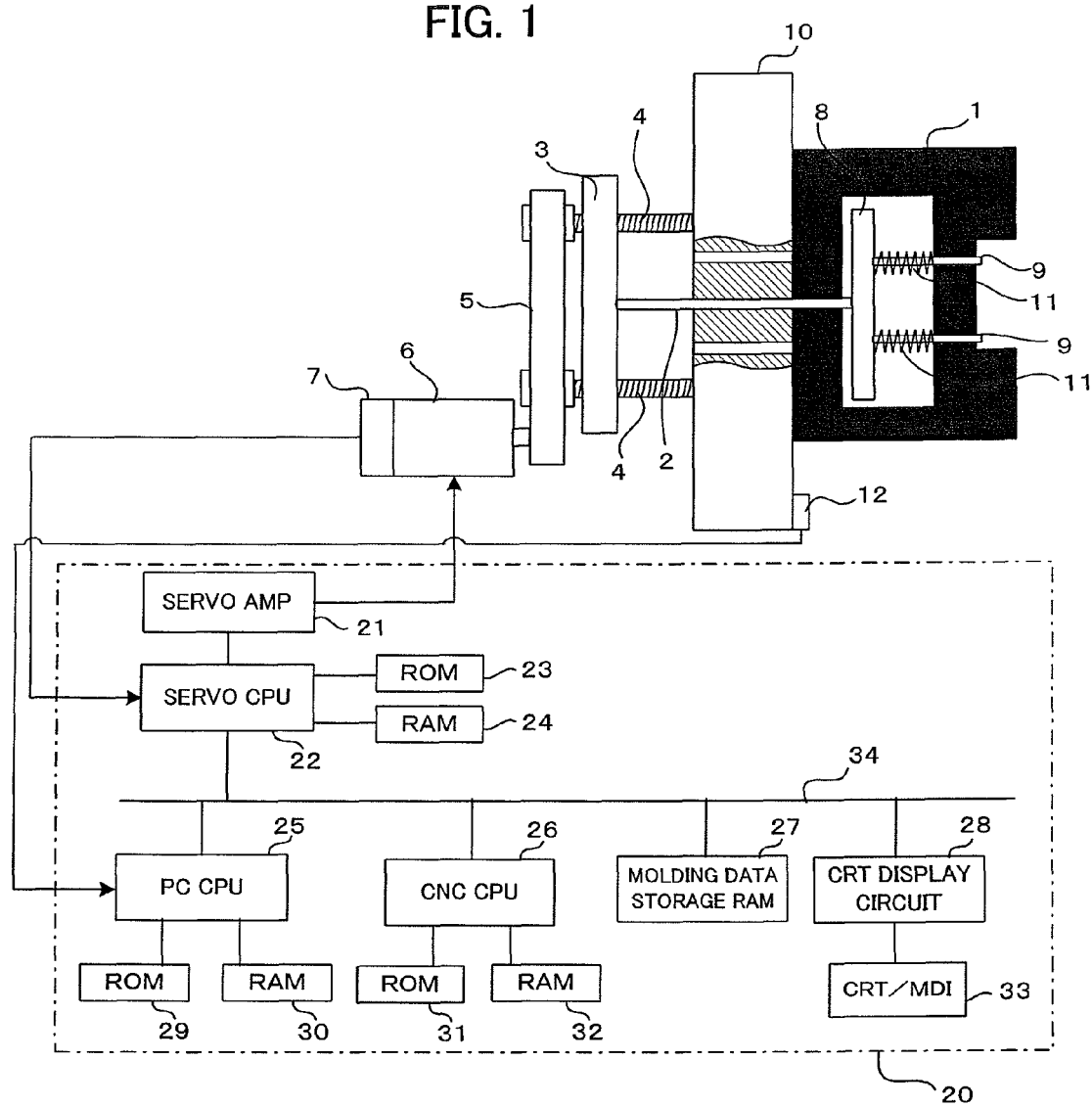
FIG. 1 is a block diagram showing essential parts of an embodiment of the present invention.

FIG. 1 is a block diagram showing essential parts of an embodiment of the present invention.

A molded article ejector comprises a movable-side mold 1 mounted on a movable platen 10, a pressure plate 3 having a molded article ejector rod 2, ball screws 4 that engage ball nuts mounted on the pressure plate 3, and a pulley/belt mechanism 5 mounted between the ball screws 4 and an output axis of a molded article ejection servo motor 6. The molded article ejector rod 2 penetrates the movable platen 10, contacts an ejector plate 8 provided inside the mold 1, pushes an ejector pin 9 mounted on the ejector plate 8 into a cavity inside the mold 1 against an elastic force exerted by return springs 11, and ejects a molded article stuck to the mold 1 so as to separate the molded article from the mold 1 and remove it. In addition, a proximity switch 12 that detects the presence of the mold (the movable-side mold) 1 mounted on the movable platen 10 is provided on the movable platen 10.

A controller 20 of the injection molding machine comprises a servo CPU 22 that is a microprocessor for servo control, a PC CPU 25 that is a microprocessor for programmable controller (PC) use, and a CNC CPU 26 that is a microprocessor for numerical control, with data transmitted between the processors via a bus 34 by selecting mutual input and output.

To the PC CPU 25 are connected a ROM 29 storing sequence programs and the like that control the sequence operations of the injection molding machine and a RAM 30 used for temporary storage of computational data and the like. Also, signals from the proximity switch 12, that is, mold presence signals, are input to the PC CPU 25 through an interface, not shown. To the CNC CPU 26 are connected a ROM 31 storing automatic operation programs and the like for overall control of the injection molding machine and a RAM 32 used for temporary storage of computational data and like.

In addition, to the servo CPU 22 are connected a ROM 23, storing control programs solely for servo control that carry out position loop, velocity loop, and electrical current loop processing, and a RAM 24, used for temporary storage of data. Furthermore, to the servo CPU 22 are also connected servo amps 34 that drive the servo motors of the axes for mold closing, injection, screw rotation, and molded article ejection and the like based on instructions from the CPU 22, although in FIG. 1 only the servo amp 21 that drives the molded article ejection servo motor 6 is shown. Moreover, output from position/velocity detectors mounted on the servo motors is fed back to the servo CPU 22, although FIG. 1 shows only a position/velocity detector 7 that is mounted on the molded article ejection servo motor 6 and detects the position and the like of the molded article ejector rod 2 by the rotational position of the servo motor 6 connected to the servo CPU 22.

A display-equipped manual data input device 33 is connected to the bus 34 via a CRT display circuit 28, so that various settings for molded article ejection and various menu screens for setting molding conditions and the like can be displayed on the CRT screen and various setting data set. In addition, there is also a ten-key for numerical data input as well as various function keys. It is possible to use something other than a CRT as the display device, for example, a liquid crystal display device.

A data storage RAM 27 constituted as a nonvolatile memory is a molding data storage memory for storing molding conditions as well as various settings and parameters relating to injection molding.

With the above-described configuration, the PC CPU 25 controls sequence operations of the injection molding machine as a whole, distributing motion commands to the servo motors of the axes based on the ROM 31 operating program and on the molding conditions stored in the molding data storage RAM 27. The servo CPU 22, based on the motion commands distributed to the axes and on the feedback signals of the positions and velocities detected by the position/velocity detectors, carries out the same servo control, such as position loop control, velocity loop control, and further, electrical current loop control, as is carried out conventionally, that is, executes so-called digital servo processing. In addition, based on the position feedback signals from the position/velocity detectors, present positions of the servo motors of each axis are stored in a present position storage register. In relation to the present invention, molded article ejection servo motor 6 position and velocity feedback control is carried out based on the position and velocity feedback signals from the position/velocity detector 7 mounted on the molded article ejection servo motor 6. In addition, a position of a distal end of the molded article ejector rod (i.e. a distal end position of the ejector pin 9) can be detected by storing in the present position storage register the rotational position of the molded article ejection servo motor 6 based on the position feedback signals.

The above-described hardware configuration is substantially identical to that of the conventional injection molding machine controller, the difference between the conventional injection molding machine and the present invention being that, in the present invention, the proximity switch 12 is provided on the movable platen 10 to detect the presence of the mold 1, and molded article ejection process software is stored in advance in the ROM 31 of the CNC CPU 26.

Figure 2:
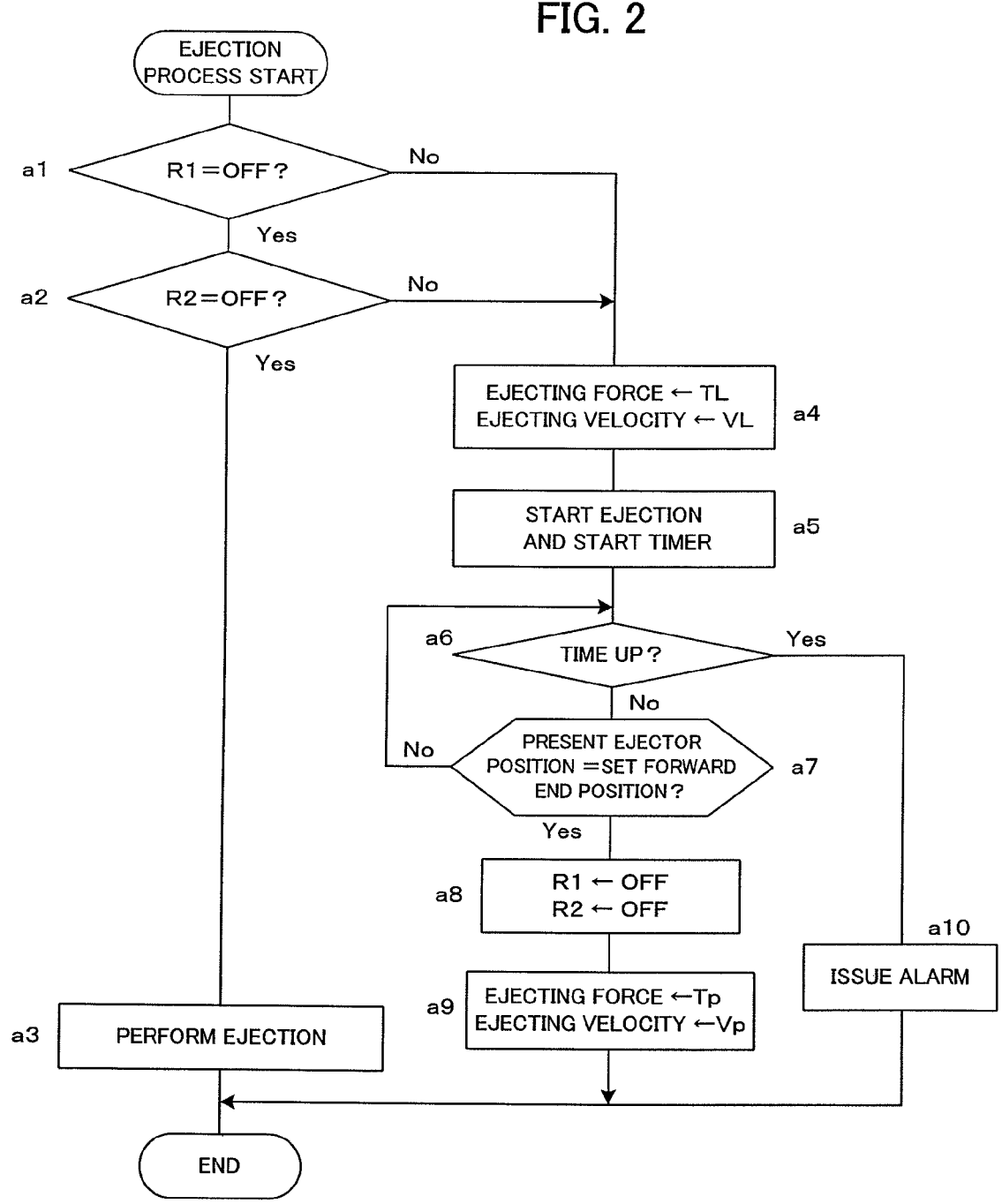
FIG. 2 is a flow chart illustrating an algorithm for a molded article ejection process in the embodiment.

FIG. 2 is a flow chart illustrating an algorithm for a molded article ejection process that is implemented by the CNC CPU 26 in the present embodiment.

Based on a molded article eject command input manually from the display-equipped manual data input device 33 or on a molded article eject command during automatic operation by the operating program, the molded article ejection process illustrated in FIG. 2 is started.

An operator, in the process of changing the mold, after mounting on the movable platen a molded article ejector rod or rods that match the configuration of the mold that is to be mounted, mounts the movable-side mold 1 on the movable platen and mounts the fixed-side mold on the fixed platen. In the present embodiment, the center one of the three rods that can be mounted according to the configuration of the mold is mounted, and the other two ejector rods above and below the center rod are removed. Next, the display-equipped manual data input device 33 is set to a molded article ejection menu screen, and through that menu screen the operator may enter various settings for the ejection conditions in the molded article ejection process suitable for the mounted mold, such as the strength of the force with which the molded article is ejected (molded article ejecting force), the ejecting velocity, the forward end position of the advancing stroke, and so forth. The molded article ejecting force sets the molded article ejection servo motor 6 output torque, and the ejecting velocity sets the rotational velocity of the molded article ejection servo motor 6 when ejecting the molded article. In addition, the advancing stroke forward end position sets the forward-most advance position when pushing the ejector pin 9 into the interior of the mold 1, and sets the rotational position of the molded article ejection servo motor 6 (the forward-most advance position of the molded article ejector rod 2) at this time.

Figure 3:
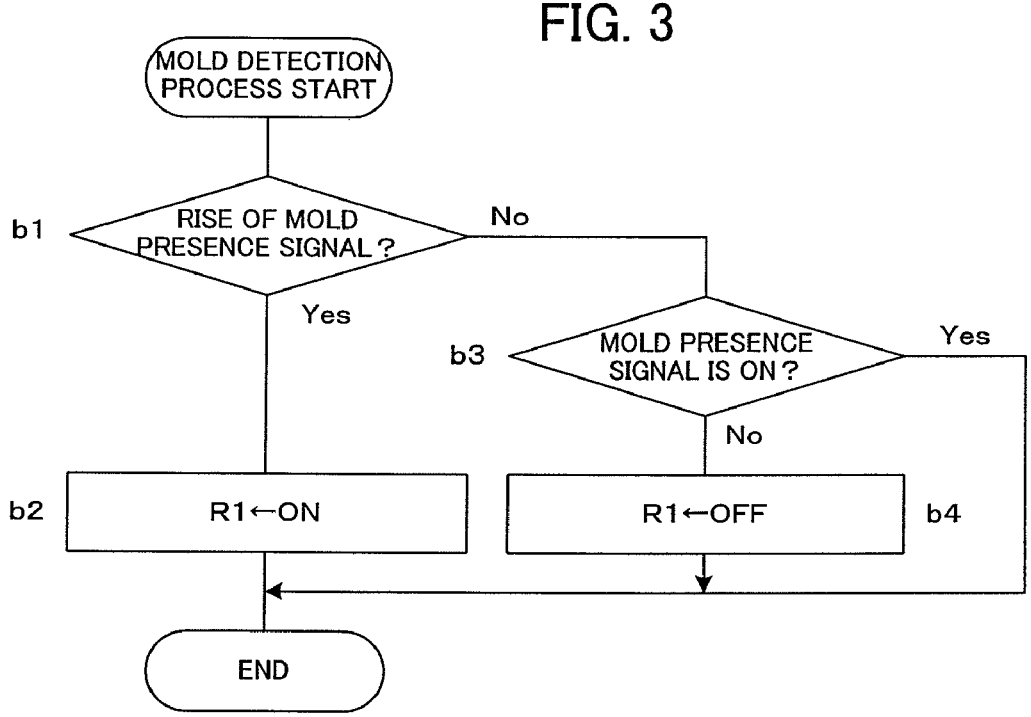
FIG. 3 is a flow chart illustrating an algorithm for a mold detection process in the embodiment.

FIG. 3 is a flow chart illustrating an algorithm for a mold detection process that monitors mounting and removal of the mold. A resistor R1 is a holding-type resistor that stays ON from when the mold is mounted on the injection molding machine until the forward end position of the ejection stroke has been confirmed. When rising of a mold presence signal from the proximity switch 12 which is indicative of the presence of the mold (i.e. turning of the mold presence signal from OFF to ON) is detected (Step b1), the resistor R1 is set to ON (Step b2) and the mold detection process is ended. By contrast, in the event that the rising of a mold presence signal from the proximity switch 12 is not detected, the process moves from Step b1 to Step b3 and the state of the proximity switch 12 is determined. In a case where the mold presence signal from the proximity switch 12 is OFF and the mold is not present, the resistor R1 is set to OFF (Step b4). When the mold presence signal is ON and in Step b3 it is determined that the mold is present, the mold detection process is ended without changing the state of the resistor R1.

Figure 4:
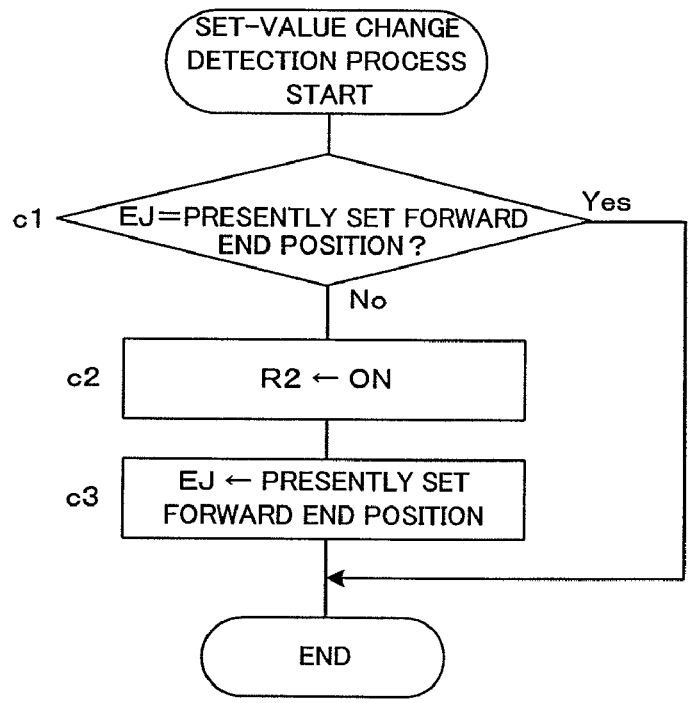
FIG. 4 is a flow chart illustrating an algorithm for a process of detecting a change in a set value for a forward end position of an ejection stroke in the embodiment.

FIG. 4 is a flow chart illustrating an algorithm for a process of detecting a change in a set value for a forward end position of an ejection stroke that monitors changes in the value set for the forward end position of the ejection stroke. A resistor R2 is a hold-type resistor that stays ON from when a set forward end position for the ejection stroke is changed until the forward end position of the ejection stroke is confirmed. A comparison is made of the presently set ejection stroke forward end position and the previous ejection stroke forward end position EJ stored in the register (Step c1), and if these are identical the set value change detection process is ended. If the positions are different, the resister R2 is set to ON (Step c2). Subsequently, the present ejection stroke forward end position setting is saved in the register that stores the previous ejection stroke forward end position EJ (Step c3) and the set value change detection process is ended.

The processes shown in FIG. 3 and FIG. 4 are executed asynchronously with the process shown in FIG. 2. However, the processes illustrated by the flow charts shown in FIG. 3 and FIG. 4 are not executed during the ejection advance shown in FIG. 2.

When a molded article eject command is issued, the CNC CPU 26 starts the process shown in FIG. 2 and determines whether the resistor R1 ON is stored (Step a1). In a case in which the mold is changed and the resister R1 has been turned ON, the process moves to Step a4. Then, the ejecting force of the molded article ejector is set to a protective ejecting force. Specifically, an execution value set for the output torque of the molded article ejection servo motor 6 is changed to a predetermined low torque TL, and at the same time an execution value set for the ejecting velocity (the rotation velocity of the molded article ejection servo motor 6) is set to a low protective ejecting velocity VL that is lower than a normal ejecting velocity (Step a4), starts the ejection process, and resets and starts a timer (Step a5). The servo CPU 22 receives the eject command, limits the output torque of the molded article ejection servo motor 6 to the set low torque (that is, sets a torque limit), drives the molded article ejection servo motor 6 at the set low velocity VL, and advances the molded article ejector rod 2. It should be noted that the small protective ejecting force TL and the low-velocity protective ejecting velocity VL are set to the minimum values that enable the ejection mechanism to be advanced.

Then, it is determined whether or not a set period of time as measured by the timer has passed (Step a6), and at the same time the present ejector position, which is the present position of the molded article ejection servo motor 6 stored in the present position storage register obtained on the basis of the position feedback signals from the position/velocity detector 7 mounted on the molded article ejection servo motor 6 (indicative of the position of the molded article ejector rod 2 and also the position of the ejector pin 9) is read, and it is determined whether or not that ejection present position has reached the set forward end position of the molded article ejection stroke that is presently set (Step a7). If it is found that the ejection present position, which is the position of the molded article ejection servo motor 6 read out from the present position storage register, has reached the set forward end position, resistor R1 and resistor R2 are set to OFF (Step a8), the execution value set for the ejecting force is set to the normal ejecting force (set torque value) Tp set as the molded article ejection condition, the execution value set for the ejecting velocity (the rotation velocity of the molded article ejection servo motor 6) is set to the normal velocity Vp set as the ejection condition (Step a9), and the molded article ejection process is ended. Thus, it can be confirmed that the molded article ejector advances to the forward end position set by the set low torque, and therefore the subsequent ejection is carried out at normal torque and velocity.

By contrast, in a case in which the value set for the forward end position of the advancing stroke is incorrect, and a value for the forward end position of the advancing stroke that is not suitable for the mounted mold 1 is set, the ejector plate 8 contacts an inner surface of the mold 1 before reaching the set forward end position and its movement is halted, the rotation of the molded article ejection servo motor 6 is stopped, and the molded article ejection servo motor 6 cannot rotate to the set position. As a result, the time as measured by the timer reaches the set time, the process moves from Step a6 to Step a10, an alarm is issued to be displayed on the display screen of the display-equipped manual data input device 33, and the molded article ejection process is ended. In this case, the resistors R1, R2 remain ON, and therefore a protective operation at low torque is carried out for the next ejector ejection.

It should be noted that, if a number of ejector rods that does not match the configuration of the mold is mounted, or if the wrong value is set for the forward end position of the advancing stroke, as described above, the ejector plate 8 pushes against the inner surface of the mold 1, but because the molded article ejection servo motor 6 that drives the ejector plate 8 using the molded article ejector rod 2 is driven at the low torque that corresponds to the small protective ejecting force, neither the mold 1 nor the molded article ejector is damaged. In addition, in a case in which the mold is fixedly mounted on the movable platen 10 magnetically, since the protective ejecting force is small the ejector plate 8 pushes the mold 1 with only the small protective ejecting force that is opposed by the attractive force of magnetism, and therefore the mold 1 does not separate from and fall off the movable platen 10. Furthermore, in the present embodiment, in Step a4 the ejecting force is set to the low-torque protective ejecting force TL, the ejecting velocity is also set to the low-velocity protective ejecting velocity VL, thereby minimizing the impact when the ejector plate 8 contacts the mold 1 for greater safety. It should be noted that it is not necessary to make the ejecting velocity a low velocity.

When it can be confirmed that the molded article ejector advances to the forward end position of the set ejection stroke by the ejection after the mold is changed, the resistors R1, R2 are turned OFF. Next, when the forward end position of the ejection stroke is changed the resistor R2 is turned ON by the process shown in the flow chart shown in FIG. 4, and when ejection is performed in this state the process moves from Step a2 to Step a4, and processing from Step a4 onward as described above is executed.

The processing of from Step a4 onward is always executed in ejection once the mold has been changed or after the setting for the forward end position of the ejection stroke has been changed. To ensure that the resistors R1, R2 do not turn OFF until in Step a7 it can be confirmed that the eject position has reached the set forward end position, thereafter the processing of from Step a4 onward is executed based on the determination made in Step a2 even in cases in which no change has been made in the forward end position of the ejection stroke.

Thus, as described above, for the first molded article eject command after the mold has been changed and a new mold mounted on the movable platen 10 as well as for the first molded article eject command after the value set for the forward end position of the ejection stroke has been changed, the processing of from Step a4 onward is always carried out, the ejection is executed with a protective ejecting force of small ejecting force TL and at a protective ejecting velocity of slow ejecting velocity VL, and if the eject position does not reach the set value, because the resistors R1, R2 are set to and remain ON, ejection is carried out with the small ejecting force TL and at the slow ejecting velocity VL until the value set for the forward end position of the advancing stroke is changed so that the eject position attains the set value.

Subsequently, when the value set for the forward end position of the advancing stroke is changed and in Step a7 it is determined that the present position of the eject position has reached the set forward end position, the resistors R1, R2 are set to OFF (Step a8), the ejecting force and the ejecting velocity are each set to the normal ejecting force Tp and the normal ejecting velocity VP, respectively (Step a9), and for all subsequent molded article eject commands the processing of Steps a1 through a3 is executed, leading to the execution of ejection as set (i.e., operation at normal ejecting force Tp, at normal ejecting velocity Vp, at the set advancing stroke forward end position).

As described above, so long as the operator does not mount a number of ejector rods and does not set a value for the forward end position of the advancing stroke of the molded article ejection suitable for the mold, molded article ejection is carried out with the small protective ejecting force TL and at the slow protective ejecting velocity VL, thereby preventing the mold or the molded article ejector from being damaged or the mold from falling. Safety is ensured by executing ejection at normal ejecting force Tp and at normal ejecting velocity Vp only when the proper values for molded article ejection have been set and the mold is no longer pushed by the molded article ejection.

What is claimed is:

1. An injection molding machine for molding an article by injecting resin into a mold, said injection molding machine comprising:
   an ejector for ejecting a molded article from the mold by actuating an ejector rod to produce a set ejecting force and advance to a set forward end position of an ejection stroke;
   first determining means for automatically determining whether or not the mold has been changed;
   second determining means for automatically determining whether or not a setting of the forward end position of the ejection stroke has been changed;
   position detection means for detecting a position of a distal end of the ejector rod of said ejector during actuation of the ejector rod;
   first setting means for setting the ejecting force to a protective ejecting force lower than a normal ejecting force when said first determining means determines that the mold has been changed or said second determining means determines that the setting of the forward end position of the ejection stroke has been changed; and
   second setting means for setting the ejecting force to the normal ejecting force when said position detecting means detects that the distal end of the ejector rod has reached the set forward end position of the ejection stroke during actuation of the ejector rod to produce the set protective ejecting force.

2. An injection molding machine according to claim 1, wherein the ejector rod of said ejector is actuated to advance at a set ejecting velocity, said first setting means sets the ejecting velocity to a protective ejecting velocity lower than a normal ejecting velocity when it is determined that the mold has been changed or that the setting of the forward end position of the ejection stroke has been changed, and said second setting means sets the ejecting velocity to the normal ejecting velocity when it is detected that the distal end of the ejector rod has reached the set forward end position of the ejection stroke during actuation of the ejector rod to advance at the set protective ejecting velocity and to produce the set protective ejecting force.

* * * * *